United States Patent
Sano et al.

(10) Patent No.: US 8,243,368 B2
(45) Date of Patent: Aug. 14, 2012

(54) OPTICAL ELEMENT AND OPTICAL APPARATUS

(75) Inventors: Daisuke Sano, Utsunomiya (JP); Yutaka Yamaguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 469 days.

(21) Appl. No.: 12/473,526

(22) Filed: May 28, 2009

(65) Prior Publication Data

US 2009/0296214 A1    Dec. 3, 2009

(30) Foreign Application Priority Data

May 28, 2008    (JP) ................. 2008-139360

(51) Int. Cl.
*G02B 27/28* (2006.01)
(52) U.S. Cl. .......... 359/489.11; 359/489.12; 359/489.13
(58) Field of Classification Search ............. 359/489.06, 359/489.11–489.13
See application file for complete search history.

(56) References Cited

U.S. PATENT DOCUMENTS

| | | |
|---|---|---|
| 2004/0047388 A1 | 3/2004 | Wang |
| 2004/0095637 A1 | 5/2004 | Nikolov |
| 2005/0045799 A1 | 3/2005 | Deng |
| 2007/0070276 A1 | 3/2007 | Tan |
| 2007/0291356 A1* | 12/2007 | Min et al. ............ 359/485 |

FOREIGN PATENT DOCUMENTS

| | | |
|---|---|---|
| EP | 1783520 A2 | 5/2007 |
| EP | 1862829 A1 | 12/2007 |
| JP | 2004-139001 A | 5/2004 |
| JP | 2007-156441 A | 6/2007 |

* cited by examiner

*Primary Examiner* — James Phan
(74) *Attorney, Agent, or Firm* — Canon USA, Inc., IP Division

(57) ABSTRACT

An optical element including a first layer (011) made of a medium having optical anisotropy, wherein a difference between refractive indexes $n_h$ and $n_l$ ($n_h > n_l$) at a central wavelength $\lambda$ for first and second polarized lights which enter the optical element and whose polarization directions are different from each other is at least 0.1, and wherein conditions $(n_{t1} - n_l) \cdot (n_l - n_{t2}) \leq 0$ and $n_{t1} < n_l$ are satisfied, where $n_{t1}$ and $n_{t2}$ denote refractive indexes of a second layer (012) and a third layer (013) optically adjacent to the first layer in both sides of the first layer and made of isotropic media at the central wavelength.

7 Claims, 9 Drawing Sheets

X DIRECTION

Y DIRECTION

X DIRECTION

Y DIRECTION

OPTICAL ELEMENT AND OPTICAL APPARATUS

BACKGROUND OF THE INVENTION

The present invention relates to an optical element using an optical anisotropic medium, and an optical apparatus such as a projector which uses the optical element.

The optical element that uses the optical anisotropy has been in wide use for polarization control, beam separation, or the like. For example, the optical element is used as a phase plate represented by a λ/4 plate or a λ/2 plate, a polarization plate represented by a polarization separation element, or an optical low-pass filter.

The optical anisotropy means a nature of variance of refractive indexes depending on a vibration direction of an incident polarized light. The use of this nature enables variance of behaviors depending on polarization directions even in the case of lights entering from the same direction.

Materials having such optical anisotropy include a crystal material such as a crystal or a limestone, a liquid crystal material, and an organic material such as plastic or a high molecule. A degree of optical anisotropy of such a material is represented by a refractive index with respect to a polarization direction.

Japanese Patent Laid-Open Nos. 2004-139001 and 2007-156441 disclose, as a method for obtaining optical anisotropy, methods which use structural anisotropy based on structures smaller than a wavelength of a used light (hereinafter referred to as a used wavelength).

In the structure smaller than the used wavelength, a light is known to behave like a homogeneous medium without being able to directly recognize the structure. In this case, the light exhibits a refractive index compliant with a filling rate. The refractive index can be obtained by a method called an effective refractive index method. A nature of variance of refractive indexes depending on polarization directions according to the filling rate of the structure is called structural anisotropy. Optionally setting a filling rate of the structure enables adjustment of a refractive index. The use of structural anisotropy enables an increase of a difference of refractive indexes depending on polarization directions as compared with a normal optical anisotropic material. Thus, a thickness for obtaining desired birefringence characteristics can be reduced.

Japanese Patent Laid-Open No. 2004-139001 discloses a phase plate which uses structural anisotropy. In the phase plate, by using the capability of the structural anisotropy to adjust the refractive index, a plurality of structural anisotropic layers (periodic structures) are combined to suppress changes in phase difference characteristics caused by wavelengths.

Japanese Patent Laid-Open No. 2007-156441 discloses an optical element which includes a structural anisotropic layer of a plane normal direction formed in one surface of a substrate, and a structural anisotropic layer of an in-plane direction in the other surface. A phase compensation plate is obtained by adjusting a refractive index based on the structural anisotropy of each surface and combining the refractive indexes. An antireflection coating is inserted to provide an antireflective function.

Japanese Patent Laid-Open No. 2004-139001 discloses an example where a material of a low refractive index having similar periodicity is disposed on a structure anisotropic layer using a medium of a high refractive index. Thus, since the material of a refractive index lower than that of each structural anisotropic layer is stacked thereon, reflection on the surface is suppressed to a certain extent. With this configuration, however, antireflective performance is insufficient.

In Japanese Patent Laid-Open No. 2007-156441, an antireflection coating is provided to a structural anisotropic layer. However, no configuration necessary for exhibiting an antireflective function is disclosed.

When the material of large refractive index variance depending on polarization directions is used, reflection-transmission characteristics greatly vary with respect to the polarization directions. Even when antireflective coating is provided, because of the large variance of refractive indexes, optimization of characteristics for each polarization direction is difficult.

SUMMARY OF THE INVENTION

The present invention provides an optical element which uses optical anisotropy and exhibits sufficient antireflective performance, and an optical apparatus which uses the optical element.

An optical element as one aspect of the present invention includes a first layer made of a medium having optical anisotropy. A difference between refractive indexes $n_h$ and $n_l$ ($n_h > n_l$) at a central wavelength λ for first and second polarized lights which enter the optical element and whose polarization directions are different from each other is at least 0.1. The following conditions (1) or (2) are satisfied, where $n_{t1}$ and $n_{t2}$ denote refractive indexes of second and third layers optically adjacent to the first layer in both sides of the first layer and made of isotropic media at the central wavelength:

$$(n_{t1}-n_l)\cdot(n_l-n_{t2}) \leq 0$$

$$n_{t1} < n_l \tag{1}$$

$$(n_{t1}-n_h)\cdot(n_h-n_{t2}) \leq 0$$

$$n_{t1} > n_h \tag{2}$$

Further features of the present invention will become apparent from the following description of exemplary embodiments (with reference to the attached drawings).

DESCRIPTION OF THE EMBODIMENTS

Exemplary embodiments of the present invention will be described below with reference to the accompanied drawings.

Figure 1:
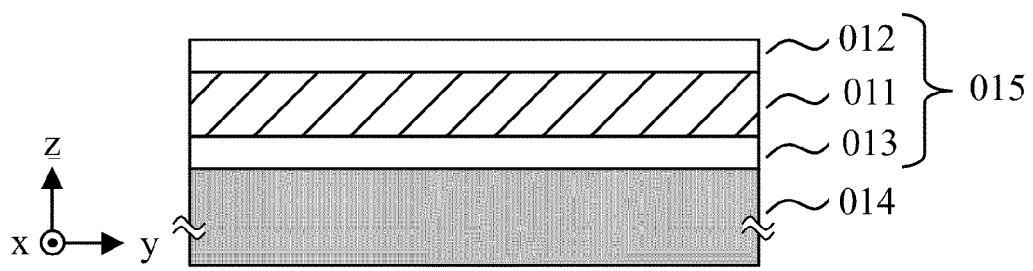
FIG. 1 is a sectional view showing a basic configuration of an optical element which is an embodiment of the present invention.

First, features common among optical elements of embodiments will be described before description of specific embodiments. FIG. 1 illustrates a basic configuration example of an optical element.

Reference numeral 011 denotes a first layer formed by a medium of optical anisotropy. Reference numerals 012 and 013 denote second and third layers constituted of homogeneous isotropic thin films and formed in both sides of the first layer 011 adjacently to the first layer 011. Reference numeral 014 denotes a substrate, and reference numeral 015 denotes an antireflective layer (antireflection coating) constituted of the first to third layers 011 to 013.

In the description below, an optical anisotropic medium for forming the first layer 011 is a uniaxial anisotropic material having an optical axis in a y-axis direction in the drawing. A refractive index of the first layer 011 with respect to a central wavelength (hereinafter referred to as a used central wavelength) of a light (first polarized light where x and z directions are polarization directions) which enters the optical element and vibrates in the x and z directions is defined as $n_h$. A refractive index at a used central wavelength of a light (second polarized light where a y direction orthogonal to the x and z directions is the polarization direction) which vibrates in the y direction is defined as $n_l$ ($n_h > n_l$). In the description below, the refractive index is a refractive index at a used central wavelength. Wavelength ranges of both polarized lights may also be referred to as used wavelengths.

In each embodiment, the optical anisotropic medium is uniaxial. However, in an optical element of another embodiment of the present invention, an optical anisotropic medium may be biaxial. A refractive index of the light vibrating in the x and z directions may be $n_l$, and a refractive index of the light vibrating in the y direction may be $n_h$ ($n_h > n_l$).

In each embodiment, a difference between the refractive indexes $n_h$ and $n_l$ is 0.1 or more. Satisfying this condition enables reduction of a thickness of the first layer 011 to obtain desired birefringence characteristics. The small thickness of the first layer 011 enables the first layer 011 to function as an interference layer. When the refractive index difference is less than 0.1, since a refractive index difference between the polarized lights is small, the thickness has to be greatly increased to obtain desired birefringence characteristics.

Figure 2A:
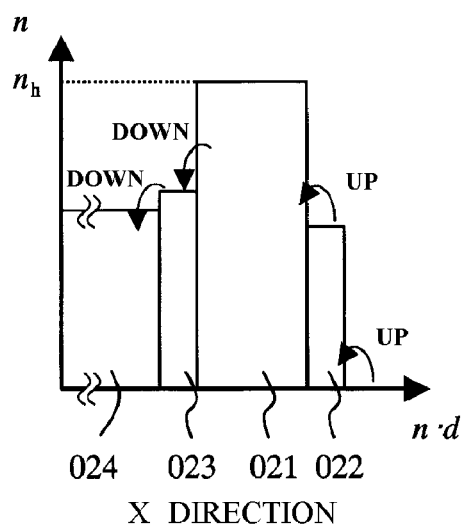
FIGS. 2A and 2B are views each showing a refractive index and an optical film thickness of the optical element of the embodiment.
Figure 2B:
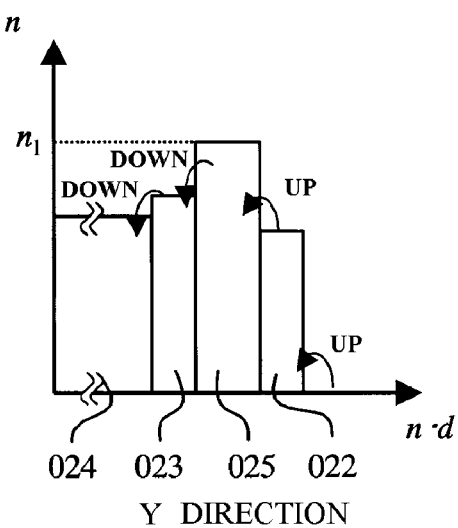

Next, referring to FIGS. 2A and 2B, a refractive index structure of each embodiment will be described. In FIGS. 2A and 2B, an abscissa axis indicates a thickness of an optical layer (hereinafter referred to as an optical film thickness) in each of x and y directions, and an ordinate axis indicates a refractive index of each layer in each of the x and y directions. A light enters the optical element from the right side of the drawing.

Reference numerals 021 and 025 denote refractive indexes ($n_h$ and $n_l$) and optical film thicknesses of the first layer 011 in the x and y directions. Reference numeral 022 denotes the same refractive index and an optical film thickness of the second layer 012 in the x and y directions, and reference numeral 023 denotes the same refractive index and an optical film thickness of the third layer 013 in the x and y directions. Reference numeral 024 denotes the same refractive index and an optical film thickness of the substrate 014 in the x and y directions. In FIGS. 2A and 2B, "up" and "down" respectively indicate "increase" and "decrease" of refractive index changes at an interface between the layers seen from the opposite side of the substrate 014.

In the first layer 011, refractive indexes are different in the x and y directions. In the second and third layers 012 and 013 and the substrate 014, however, since they are isotropic media, refractive indexes are equal irrespective of directions. Thus, the optical element has an overall structure where refractive indexes are different in the x and y directions. The optical film thicknesses of the first layer 011 are also different according to a ratio of refractive indexes of the x and y directions.

In the antireflective structure, an antireflective function is obtained by reflecting a light incident on the substrate on a plurality of interfaces, and interfering the reflected lights with each other considered as waves. An interfering method in the antireflective structure will be described briefly.

Figure 16:
FIG. 16 is a sectional view showing an optical element which includes only a substrate.

First, an optical element that includes only a substrate will be considered. FIG. 16 shows a configuration example of the optical element. Reference numeral 161 denotes a substrate made of an isotropic medium.

Figure 3:
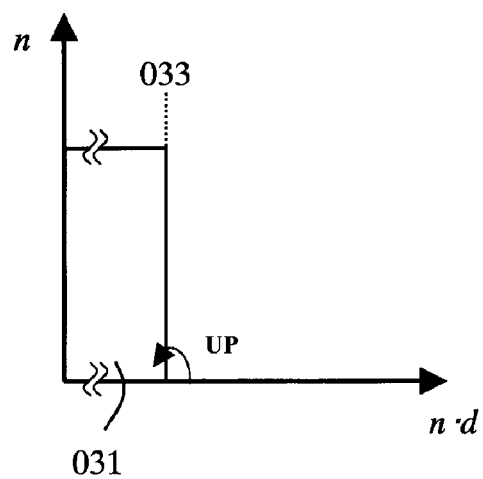
FIG. 3 is a view showing a refractive index and an optical film thickness of only a substrate of the optical element.

FIG. 3 shows a refractive index structure of this optical element. In FIG. 3, an abscissa axis indicates an optical film thickness, and an ordinate axis indicates a refractive index. The same applies to the drawings showing other refractive index structures described below. In FIG. 3, reference numeral 031 denotes a refractive index of the substrate 161, and reference numeral 033 denotes an interface between the substrate 161 and an incident medium.

A light is reflected on the interface 033, and amplitude of a wave of its reflected light is obtained from a refractive index difference between the incident medium and the substrate 161. The amplitude is represented by Fresnel coefficient, and set to a negative value if a refractive index change at the interface 033 is a refractive index increase when seen from the incident side, and to a positive value in the case of a refractive index decrease. Such a value indicates a phase change amount of the light reflected on the interface 033.

Figure 4:
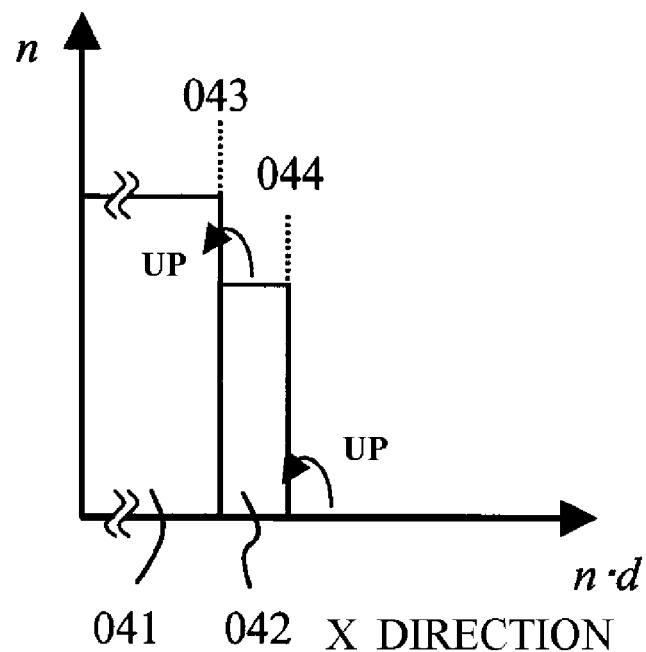
FIG. 4 is a view showing a refractive index structure when a thin film of a lower refractive index is formed on the substrate.
Figure 5:
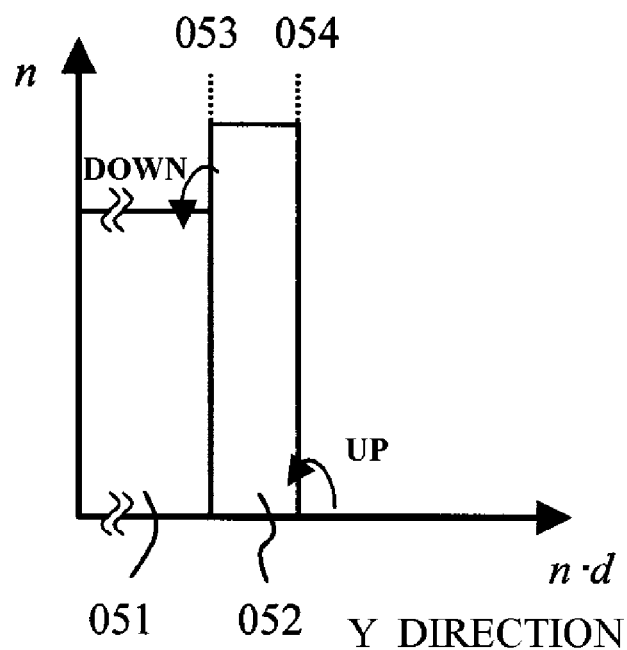
FIG. 5 is a view showing a refractive index structure when a thin film of a higher refractive index is formed on the substrate.
Figure 17:
FIG. 17 is a sectional view showing an optical element which includes a thin film formed on a substrate.

FIG. 17 shows a configuration example where a thin-film layer is disposed as a single antireflective layer in the configuration of FIG. 16. Reference numeral 171 denotes a substrate, and reference numeral 172 denotes a thin-film layer as an antireflective layer. FIGS. 4 and 5 show a refractive index structure of this optical element. Reference numerals 041 and 051 denote refractive indexes equal in x and y directions of a substrate 171, and reference numerals 042 and 052 denote equal refractive indexes and optical thin films in x and y directions of the thin-film layer 172. Reference numeral 043 denotes an interface between the substrate 171 and the thin-film layer 172, reference numeral 044 denotes an interface between the incident medium and the thin-film layer 172, reference numeral 053 denotes an interface between the substrate 171 and the thin-film layer 172, and reference numeral 054 denotes an interface between the incident medium and the thin-film layer 172.

FIG. 4 shows a configuration example where a thin-film layer having a refractive index intermediate between those of the substrate and the incident medium is inserted between the substrate and the incident medium. Reflection of a light in this configuration is overlapping of reflection on the interface 043 and reflection on the interface 044. A state of this overlapped reflection is determined by an optical film thickness of the thin-film layer 172.

As in the case of the example, when refractive index changes at the interfaces 043 and 044 of both sides of the thin-film layer 172 are both increases, phase changes of waves of reflected lights on both interfaces 043 and 044 are similar. A condition for canceling waves with each other is an optical film thickness of $\lambda/4$, and a reinforcing condition is an optical film thickness of $\lambda/2$. In the latter case, a reflected light of intensity equal to that of the reflected light on the interface 033 of FIG. 3 is generated. In this example, the case where the refractive index changes at the interfaces 043 and 044 are both increases. The same applies when the refractive index changes at the interfaces are both decreases.

In this configuration, because of an energy conservation law, amplitude of a reflected light on each interface is not larger than that of the reflected light on the interface 033 of FIG. 3. In view of wave interferences, only an amount of reflected light equal to that of reflected light in FIG. 3 is generated even under the reinforcing condition of the waves. Thus, a total amount of reflected wave in the configuration of FIG. 4 is smaller than that in the configuration of FIG. 3. In other words, the thin-film layer where refractive index change directions are similar between both interfaces becomes a layer for "decreasing the amount of reflected light".

FIG. 5 shows a configuration example where a thin-film layer having a refractive index higher than those of the substrate and the incident medium is inserted between the substrate and the incident medium.

Reflection of a light in this configuration is overlapping of reflection on the interface 053 and reflection on the interface 054. This overlapping method is determined by an optical film thickness of the thin-film layer 172. When refractive index changes at the interfaces 053 and 054 of both sides of the thin-film layer 172 are different, an increase and a decrease, phase changes of waves of reflected lights on both interfaces 053 and 054 are reverse. A condition for canceling waves with each other is an optical film thickness of $\lambda/2$, and a reinforcing condition is an optical film thickness of $\lambda/4$. In the former case, a reflected light of intensity equal to that of the reflected light on the interface 033 of FIG. 3 is generated. In this example, the case where the refractive index changes at the interfaces are the increase and the decrease is described. The same applies when the refractive index changes at both interfaces are a decrease and an increase.

In this configuration, amplitude of a reflected light on each interface is larger than that of the reflected light on the interface 033 of FIG. 3. In view of wave interferences, an amount of reflected light equal to that of reflected light in FIG. 3 is generated even under the reinforcing condition of the waves. Thus, a total amount of reflected wave in the configuration of FIG. 5 is larger than that in the configuration of FIG. 3. In other words, the thin-film layer where refractive index change directions are different between both interfaces becomes a layer for "increasing the amount of reflected light".

An antireflective layer is formed by combining the two types of thin-film layers in many cases. The simple use of the former configuration leads to a reduction in amount of reflected light. However, a material usable as an antireflective layer is discrete and selective, and a high-performance antireflective function is accordingly difficult to be obtained only by the former configuration. Thus, combining the former configuration with the latter configuration enables adjustment of intensity of a partial reflected light, thereby decreasing intensity of the reflected light by the former case. As a result, a high-performance antireflective layer (antireflection coating) is obtained.

As described above, in view of wave interferences, the optical film thicknesses of $\lambda/4$ and $\lambda/2$ have opposite characteristics. The optical film thickness of "$\lambda/4$" can be represented by $(2m+1)\lambda/4$ (same characteristics are obtained) where m is a natural number, and the optical film thickness of "$\lambda/2$" can be represented by $m\lambda/2$.

Based on this theory, to reduce a reflected light for each thin-film layer, advisably, an optical film thickness of the thin-film layer is set to a film thickness corresponding to a refractive index change at an interface between both sides of the thin-film layer. For example, when two thin-film layers of refractive indexes sequentially lower with respect to a refractive index of the substrate are stacked, refractive index changes at the interfaces of the thin-film layer are all positive (increase). Therefore, it is preferable that the optical film thickness of these thin-film layers is set to $\lambda/4$. Strictly, intensity of a reflected light obtained from a refractive index difference between the interfaces has to be taken into consideration. But the description is omitted.

When the refractive index structure of the optical element shown in FIG. 2 is taken into consideration based on the theory, the optical film thicknesses 021 and 025 of the first layer 011 are different between the x and y directions. It is because a difference in refractive indexes between the directions causes a difference in optical film thickness between the directions even while a physical film thickness is constant. In the case of such an optical element, for example the case of the $\lambda/4$ plate, the difference between the optical film thicknesses of both polarizations is $\lambda/4$. Therefore, the optical film thicknesses are $\lambda/4$ and $\lambda/2$ in a polarization direction, resulting in layers of opposite characteristics in the antireflective structure.

Figure 18A:
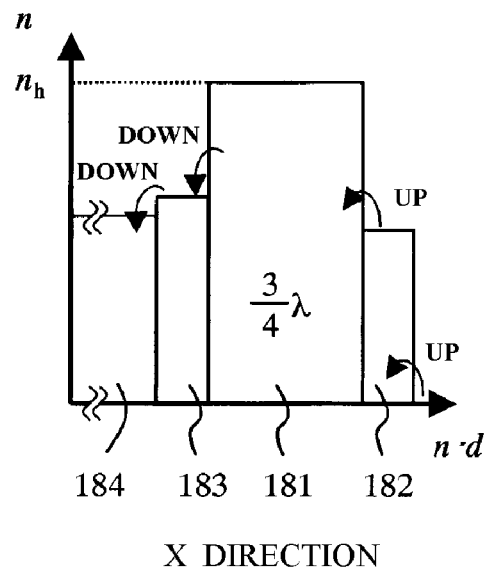
FIGS. 18A and 18B are views each illustrating a refractive index structure of an optical element which includes an optical anisotropic layer and a thin film stacked on a substrate.
Figure 18B:
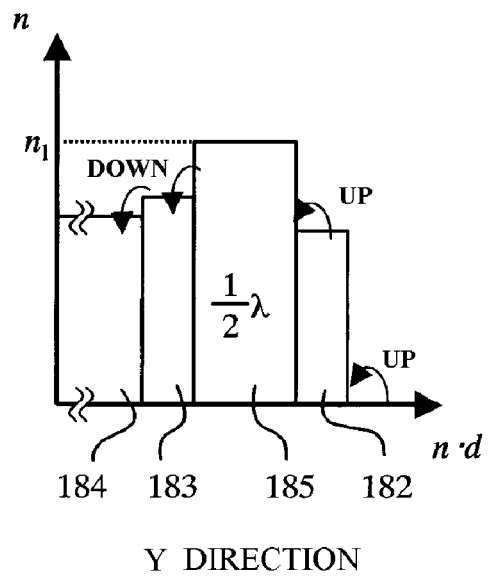

FIGS. 18A and 18B show a refractive index structure in this case. Reference numerals 181 and 185 denote refractive indexes ($n_h$, $n_l$) and optical film thicknesses in the x and y directions of the first layer 011, and reference numeral 182 denotes equal refractive indexes and optical film thicknesses in the x and y directions of the second layer 012 equivalent to the thin-film layer 042 of FIG. 4. Reference numeral 183 denotes equal refractive indexes and optical film thicknesses in the x and y directions of a third layer 013 corresponding to the thin-film layer 052 of FIG. 5. Reference numeral 184 denotes equal refractive indexes and optical film thicknesses in the x and y directions of the substrate 014.

The optical film thickness 181 in the x direction of the first layer 011 is $3\lambda/4$, and the optical film thickness 185 in the y direction is $\lambda/2$. The refractive index 182 of the second layer 012 is smaller than refractive indexes 181 ($n_h$) and 185 ($n_l$) of the first layer 011, and the refractive index 183 of the third layer 013 is set to an intermediate value between the refractive index 184 of the substrate 014 and the refractive index 185 ($n_l$) of the first layer 011.

In the configuration of the x direction, refractive index changes of the refractive index 181 of the first layer 011 on both interfaces are reverse, and the layer of the optical film thickness of 3λ/4 is not suited as an antireflective layer.

In the configuration of the y direction, refractive index changes of the refractive index 185 of the first layer 011 on both interfaces are reverse. However, the configuration is suited as a configuration of an antireflection coating at an optical film thickness of λ/2. In other words, since the configuration is ideal in all the layers, antireflective performance is greatly improved.

Thus, to obtain good antireflective functions in both of the x and y directions, specific conditions are necessary.

The optical element of the embodiment satisfies the following conditions represented by expressions (1) and (2). In these conditional expressions, refractive indexes of the first layer at a used central wavelength λ with respect to first and second polarized lights (x-polarized light and y-polarized light) which enter the optical element and whose polarization directions are orthogonal to each other are $n_h$ and $n_l$. Refractive indexes of the second and third layers optically adjacent to the first layer on both sides of the first layer are $n_{t1}$ and $n_{t2}$. The first layer is made of an optical anisotropic medium, and the second and third layers are made of isotropic media.

The phrase "optically adjacent" includes not only a case where the first to third layers come into contact with one another (mechanically adjacent) at one interface as shown in FIG. 1, but also a case where insertion layers extremely thinner than each layer and having limited optical influence are held among the first to third layers. In the description below, optically adjacent may be simply referred to as adjacent.

$$(n_{t1}-n_l)\cdot(n_l-n_{t2}) \leq 0$$

$$n_{t1} < n_l \quad (1)$$

$$(n_{t1}-n_h)\cdot(n_h-n_{t2}) \leq 0$$

$$n_{t1} > n_h \quad (2)$$

In the configuration of FIG. 1, the first layer 011 has a refractive index (maximum refractive index) $n_h$ and a refractive index (minimum refractive index) $n_l$ in the x and y directions. In both sides of the first layer 011, the second and third layers 012 and 013 are adjacent to the first layer 011.

The expressions (1) and (2) indicate that the refractive indexes $n_{t1}$ and $n_{t2}$ of the second and third layers 012 and 013 are both equal to the minimum refractive index $n_l$ or less, or the maximum refractive index $n_h$ or more of the first layer 011. Satisfying the conditions causes a refractive index change at the interface of the first layer 011 to be in the same direction with respect to both polarized lights, and refractive index changes at both interfaces of the first layer 011 to be reverse. Thus, the aforementioned "layer for increasing the amount of reflected light" is configured for both polarized lights. With this layer configuration, the first layer 011 for both polarized lights becomes a layer for adjusting the amount of reflected light in the antireflective layer 015, and a layer for actually reducing the amount of reflected light is the second layer 012 or the third layer 013.

The layer for adjusting the amount of reflected light has characteristics that changes of characteristics to an optical film thickness is more insensitive as compared with the layer for reducing the amount of reflected light. Thus, the adoption of the configuration enables improvement of reflectance characteristics for both polarized lights.

If the condition is not satisfied, the refractive index structure of the first layer 011 with respect to a polarization directions becomes a layer for "decreasing the amount of reflected light" for at least one of both polarized lights. This state is not preferable because reflection characteristics greatly vary from one polarized light to another.

In the embodiment, among the minimum and maximum refractive indexes $n_l$ and $n_h$ at the used central wavelength λ of the first layer 011, the refractive index having a larger difference from the refractive indexes $n_{t1}$ and $n_{t2}$ of the second third layers 012 and 013 is n, and a thickness of the first layer 011 is d. In this case, preferably, a condition represented by the following expression (3) is satisfied.

$$0.7m \cdot \frac{\lambda}{2} \leq n \cdot d \leq 1.3m \cdot \frac{\lambda}{2} \quad (m \text{ is a natural number)} \quad (3)$$

For the condition of the expression (3), the refractive index structure of FIG. 2 will be described as an example. When $n_h-n_{t1}$, $n_h-n_{t2}$, $n_l-n_{t1}$, and $n_l-n_{t2}$ are compared with one another, a refractive index difference indicated by $n_h-n_{t1}$ is largest. Thus, n of the expression (3) becomes $n_h$. In other words, in the refractive index structure of FIG. 2, the optical film thickness 021 of the first layer 011 of FIG. 2A is a natural number multiple of λ/2. The adoption of this refractive index structure enables setting of the optical film thickness 021 of the first layer 011 to λ/2 which is an ideal value with respect to a refractive index change.

On the other hand, in the refractive index structure of FIG. 2B, the optical film thickness 025 of the first layer 011 is not set to an ideal value for a refractive index change. However, since the first layer 011 has small refractive index differences from the second and third layers 012 and 013, a refractive index is difficult to increase.

The above refractive index structure is usable for all optical elements which use media of high optical anisotropy. For example, in the case of the λ/4 plate, an optical film thickness difference between polarized lights is λ/4. In other words, when one of the optical film thicknesses in the x and y directions of the first layer 011 is set to λ/2, the other optical film thickness becomes λ/4. The antireflective function accordingly has opposite characteristics between polarization directions. However, setting polarization so that one of the optical film thicknesses in the x and y directions of the first layer 011 can be selectively set to λ/2 enables balancing between polarization of an optical film thickness of λ/4 and reflection-transmission characteristics.

When the present invention is applied to an optical element which uses an optical anisotropic medium other than the λ/4 plate, an optical film thickness difference has less influence on antireflective performance as compared with the λ/4 plate. Thus, in all the optical elements using optical anisotropic media, reflection-transmission characteristics can be improved with respect to both polarized lights.

Next, a case where the optical film thickness 025 of the first layer 011 having a refractive index of $n_l$ is set to λ/2 will be considered. In this case, the refractive index structure shown in FIG. 2B is an ideal structure for refractive index changes. However, in the refractive index structure of FIG. 2A, the optical film thickness 021 of the first layer 011 is not set to an ideal value for refractive index changes. In the refractive index structure of FIG. 2A, refractive index differences of the first layer 011 from the second and third layers 022 and 023 are large. As a result, refractive indexes are greatly different between the refractive index structures of FIGS. 2A and 2B.

In the embodiment, an insertion layer may be disposed at least one of between the fist and second layers 011 and 012 and between the first and third layers 011 and 013. In this case, the expression (1) or (2) is established. The insertion layer has a refractive index of $n_h$ or more.

The insertion layer held between the first and second layers 011 and 012 is defined as a first insertion layer, and the insertion layer held between the first and third layers 011 and 013 is defined as a second insertion layer. When a refractive index and a layer thickness of the first insertion layer are respectively $n_{o1}$ and $d_{o1}$ at a used central wavelength, and a refractive index and a layer thickness of the second insertion layer are respectively $n_{o2}$ and $d_{o2}$, a condition represented by the following expression (4) is preferably satisfied.

$$0 \leq n_{o1} \cdot d_{o1} \leq \frac{\lambda}{6} \quad (4)$$
$$0 \leq n_{o2} \cdot d_{o2} \leq \frac{\lambda}{6}$$

Figure 19:
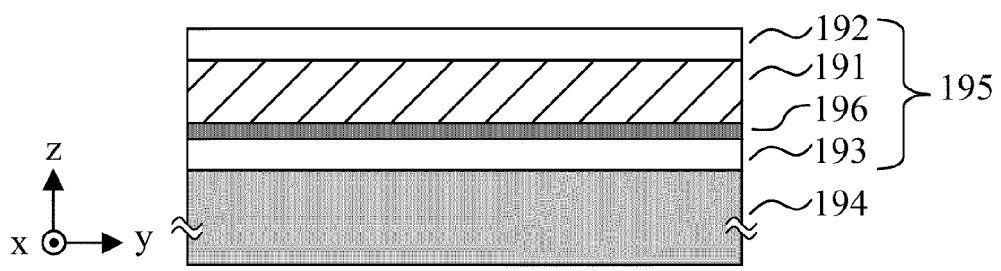
FIG. 19 is a sectional view showing an optical element of an embodiment where an insertion layer is added to the basic configuration of FIG. 1.

FIG. 19 shows a configuration example of an optical element which includes an insertion layer. Reference numeral 191 denotes a first layer, reference numeral 192 denotes a second layer, and reference numeral 193 denotes a third layer. Reference numeral 196 denotes an insertion layer (second insertion layer) disposed between the first and third layers 191 and 193. The insertion layer 196 is a thin film made of a homogeneous isotropic medium. Reference numeral 194 denotes a substrate, and reference numeral 195 denotes an antireflective layer (antireflection coating) which includes the first to third layers 191 to 193 and the insertion layer 196.

Figure 20A:
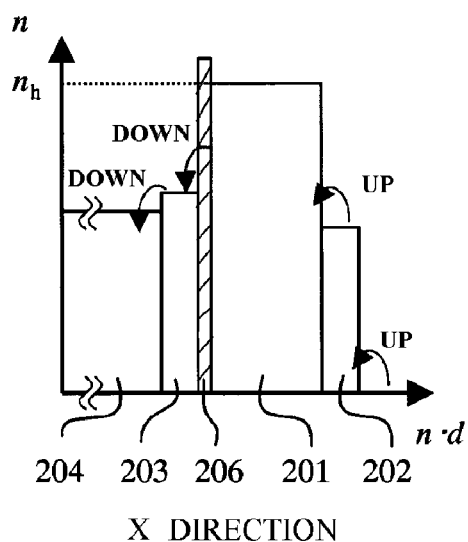
FIGS. 20A and 20B are views each illustrating a refractive index structure of the optical element of FIG. 19.
Figure 20B:
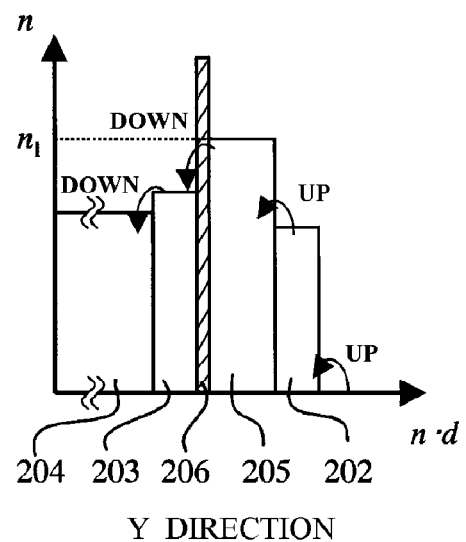

FIGS. 20A and 20B show the refractive index structure of the optical element of FIG. 19. Reference numerals 201 and 205 denote refractive indexes and optical film thicknesses in the x and y directions of the first layer 191, and reference numeral 202 denotes equal refractive indexes and optical film thicknesses in the x and y direction of the second layer 192. Reference numeral 203 denotes equal refractive indexes and optical film thicknesses in the x and y direction of the third layer 193, and reference numeral 204 denotes equal refractive indexes and optical film thicknesses in the x and y directions of the substrate 194. Reference numeral 206 denotes equal refractive indexes and optical film thicknesses in the x and y direction of the insertion layer 196.

As shown in FIGS. 20A and 20B, the refractive index 206 of the insertion layer 196 is higher than the refractive indexes $n_h$ and $n_l$. Thus, this case is outside the above condition for the optical element which includes no insertion layer 196. However, an optical film thickness of the insertion layer 196 is extremely small as compared with those of the other layers, and thus influence on characteristics of the optical element is limited. In other words, even when the insertion layer 196 is disposed, the first and third layers 191 and 193 can be considered to be optically adjacent to each other. The same applies when an insertion layer is disposed between the first and second layers 191 and 192.

An optical film thickness of the insertion layer 196 is preferably set to $\lambda/8$ or less, and more preferably $\lambda/10$ or less. For the insertion layer 196, a hard coat layer, an antidazzle layer, or an adhesive layer is used.

In the embodiment, the first layer may be a layer provided with structural anisotropy realized by forming a plurality of structures smaller than the used central wavelength $\lambda$.

Figure 6:
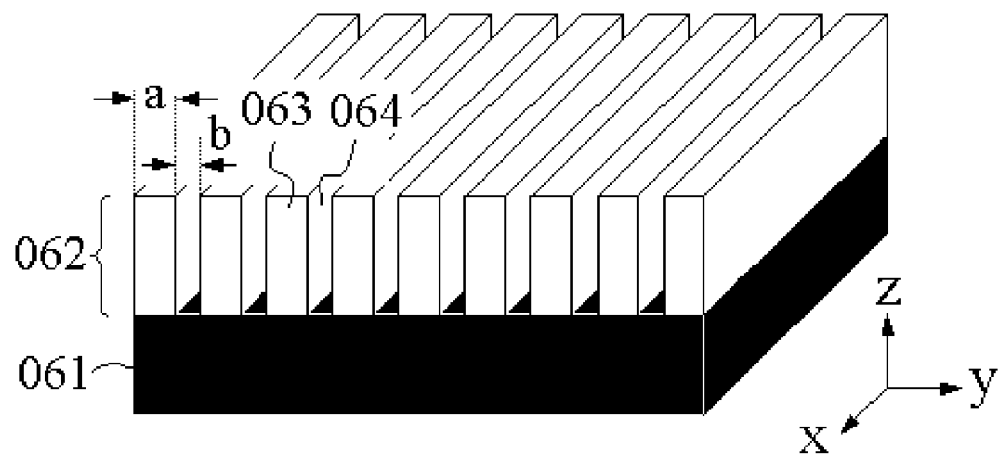
FIG. 6 is a schematic view of the optical element of the embodiment which includes a structural anisotropic layer.

FIG. 6 shows a structure example of the first layer having structural anisotropy. Reference numeral 061 denotes a substrate, reference numeral 062 denotes a first layer having structural anisotropy. The first layer 062 includes rectangular lattices made of materials 063 and rectangular lattices made of materials 064 different from the materials 063 which are alternately and periodically formed in a one-dimensional direction. The lattices made of the materials 063 and 064 constitute one structure smaller than the used central wavelength $\lambda$, and a plurality of these structures are formed in the first layer 062. The structures are uniform in the x and z directions, and periodic in the y direction. Reference code a denotes a width of the lattice made of the material 063, reference code b denotes a width of the lattice made of the material 064 (interval between the lattices of the materials 063), and a+b is smaller than the used central wavelength $\lambda$.

In the structure smaller than a wavelength of an incident light, a light behaves as if a homogeneous medium is present without being able to directly recognize the structure. In FIG. 6, the first layer 062 functions as a layer having a homogeneous film and an equivalent refractive index, and has characteristics according to the periodic structure.

A refractive index $n_x$ for a polarized light where the x direction is a polarization direction and a refractive index $n_y$ for a polarized light where the y direction is a polarization direction in the first layer 062 are represented by the following expressions (5) and (6), where $n_1$ denotes a refractive index of the material 063 and $n_2$ denotes a refractive index of the material 064.

$$n_x = \sqrt{\frac{an_1^2 + bn_2^2}{a+b}} \quad (5)$$

$$n_y = \sqrt{\frac{a+b}{a/n_1^2 + b/n_2^2}} \quad (6)$$

The expressions (5) and (6) are based on a method called an effective refractive index method. This method can obtain a refractive index of a structure anisotropic layer based on a material of the layer and its filling rate ff{=a/(a+b)}. Strictly, a structure interval and a used wavelength have influence, but description thereof is omitted.

To provide the structure anisotropic layer with high anisotropy, setting a large refractive index difference between the materials (materials 063 and 064 shown in FIG. 6) of the structure anisotropic layer is effective. Thus, generally, a material of a high refractive index is used for the material 063, and air is used for the material 064.

For example, when $TiO_2$ (refractive index 2.3) is used for the material 063, and air (refractive index 1.0) is used for the material 064 to set a=b, $n_x(n_h)$ is set to 1.77, and $n_y(n_l)$ is set to 1.30, obtaining a very large refractive index difference.

Achieving high anisotropy enables great reduction of a thickness of the structure anisotropic layer to obtain a desired phase difference. For example, when the structure anisotropic layer (first layer) 062 is used as a $\lambda/4$ plate, a thickness is 320 nm at a used central wavelength $\lambda$ of 550 nm.

FIG. 6 shows the case where the structures constituted of the rectangular lattices are periodically arrayed in the one-dimensional direction. However, the structures may be periodically arrayed in a two-dimensional or three-dimensional direction. The structures are not limited to the rectangular lattices, but cylindrical or spherical lattices may be used. If one of the structures is smaller than the used central wavelength, the structures don't have to be arrayed periodically.

In the embodiment, an inorganic material may be used for a medium having optical anisotropy. The inorganic material has high weather resistance and high heat resistance as compared with an organic material. Using the characteristics enables exhibition of sufficient performance even in an optical element used under severe environment and temperature conditions.

Hereinafter, specific embodiments will be described with reflectance characteristics at design values (experiment values) and an incident angle 0°. In each embodiment, a used wavelength range is 500 to 600 nm, and a used central wavelength is 550 nm. However, these are only examples, and the embodiments of the present invention are not limited to these conditions.

Embodiment 1

In Embodiment 1, a substrate having a refractive index of 1.53 is prepared, a thin film (third layer) having a refractive index of 1.63 and a physical film thickness (hereinafter simply referred to as film thickness) of 84 nm is stacked on a surface of the substrate, and an optical anisotropic layer (first layer) is stacked on a surface of the thin film. A thin film (second layer) having a refractive index of 1.38 and a film thickness of 100 nm is stacked on a surface of the optical anisotropic layer.

Figure 7:
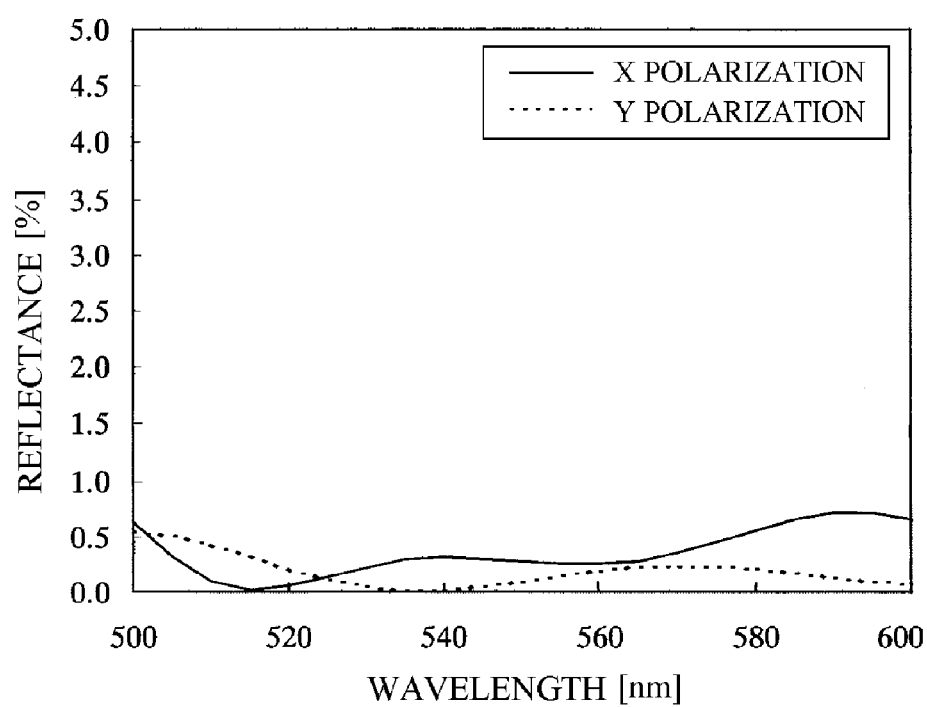
FIG. 7 is a view showing reflectance characteristics of an optical element of Embodiment 1.

Refractive indexes $n_x(n_h)$ and $n_y(n_l)$ of the optical anisotropic layer are respectively 1.92 and 1.80. A physical film thickness of the optical anisotropic layer is 1108 nm. FIG. 7 shows reflectance characteristics of the embodiment.

Refractive indexes (1.38 and 1.63) of the thin films adjacent to the optical anisotropic layer satisfy the conditional expression (1). However, the conditional expression (3) is not satisfied. As shown in FIG. 7, reflectances are sufficiently reduced for both polarized lights (x-polarized and y-polarized lights) at a wavelength of 550 nm.

Embodiment 2

In Embodiment 2, a substrate having a refractive index of 1.53 is prepared, a thin film (third layer) having a refractive index of 1.63 and a film thickness of 84 nm is stacked on a surface of the substrate, and an optical anisotropic layer (first layer) is stacked on a surface of the thin film. A thin film (second layer) having a refractive index of 1.38 and a film thickness of 100 nm is stacked on a surface of the optical anisotropic layer. In the optical anisotropic layer, a structure having a refractive index of 2.3 is formed into a one-dimensional lattice shape smaller than a used wavelength. A filling rate is 0.85.

Figure 8:
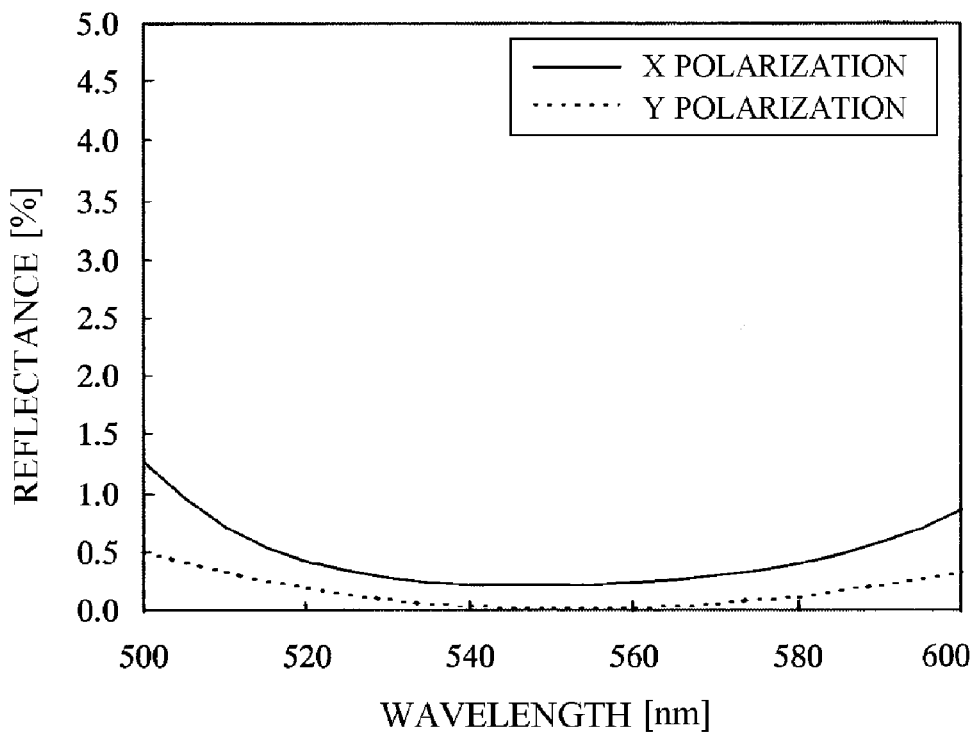
FIG. 8 is a view showing reflectance characteristics of an optical element of Embodiment 2.

Refractive indexes $n_x(n_h)$ and $n_y(n_l)$ of the optical anisotropic layer are respectively 2.16 and 1.80. A physical film thickness of the optical anisotropic layer is 382 nm. FIG. 8 shows reflectance characteristics of the embodiment.

Refractive indexes (1.38 and 1.63) of the thin films adjacent to the optical anisotropic layer satisfy the conditional expression (1). The conditional expression (3) is also satisfied. As shown in FIG. 8, reflectances are sufficiently reduced for both polarized lights at a wavelength of 550 nm.

Embodiment 3

In Embodiment 3, a substrate having a refractive index of 2.0 is prepared, a thin film (third layer) having a refractive index of 1.63 and a film thickness of 169 nm is stacked on a surface of the substrate, and an optical anisotropic layer (first layer) is stacked on a surface of the thin film. A thin film (second layer) having a refractive index of 1.38 and a film thickness of 100 nm is stacked on a surface of the optical anisotropic layer. In the optical anisotropic layer, a structure having a refractive index of 2.5 is formed into a one-dimensional lattice shape smaller than a used wavelength. A filling rate is 0.9.

Figure 9:
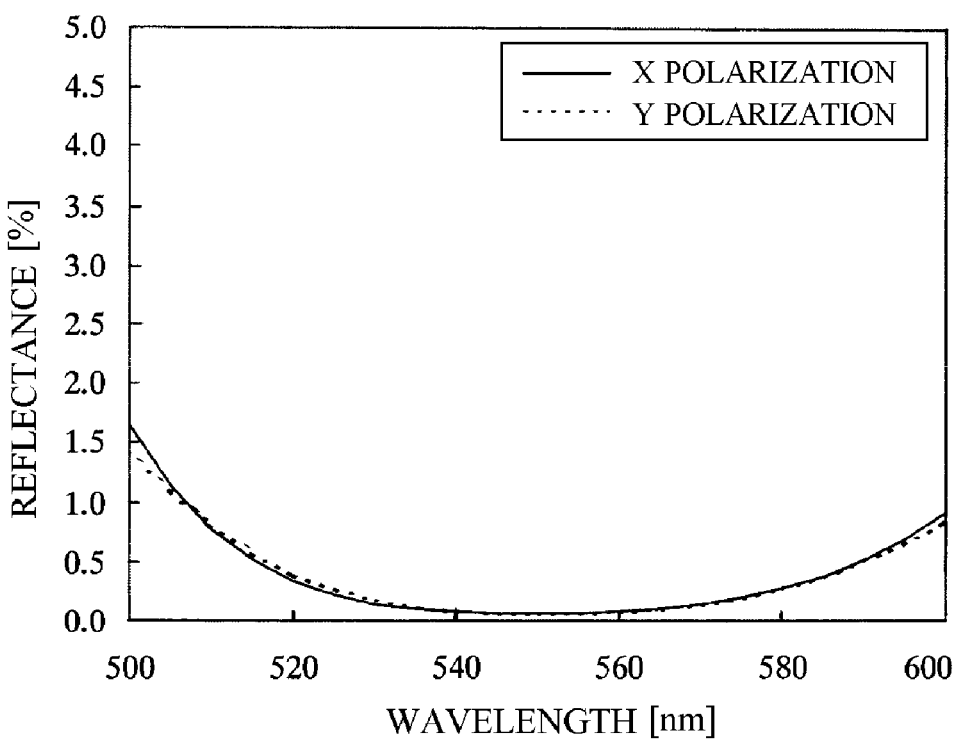
FIG. 9 is a view showing reflectance characteristics of an optical element of Embodiment 3.

Refractive indexes $n_x(n_h)$ and $n_y(n_l)$ of the optical anisotropic layer are respectively 2.40 and 2.00. A physical film thickness of the optical anisotropic layer is 344 nm. FIG. 9 shows reflectance characteristics of the embodiment.

Refractive indexes (1.38 and 1.63) of the thin films adjacent to the optical anisotropic layer satisfy the conditional expression (1). The conditional expression (3) is also satisfied. As shown in FIG. 9, reflectances are sufficiently reduced for both polarized lights at a wavelength of 550 nm.

Embodiment 4

Figure 10:
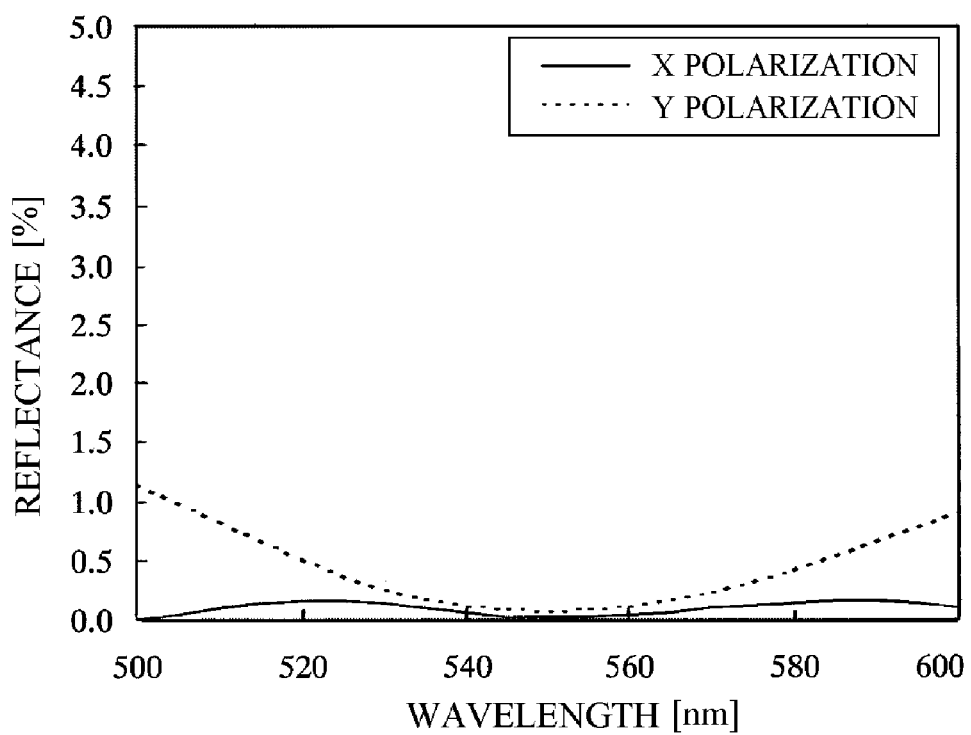
FIG. 10 is a view showing reflectance characteristics of an optical element of Embodiment 4.

In Embodiment 4, a substrate having a refractive index of 1.80 is prepared, a thin film (third layer) having a refractive index of 2.00 and a film thickness of 138 nm is stacked on a surface of the substrate, and an optical anisotropic layer (first layer) is stacked on a surface of the thin film. A film (second layer) having a refractive index of 2.00 and a film thickness of 138 nm is stacked on a surface of the optical anisotropic layer, and further a thin film having a refractive index of 1.38 and a film thickness of 100 nm is stacked on a surface of the film. Refractive indexes $n_x(n_h)$ and $n_y(n_l)$ of the optical anisotropic layer are respectively 1.87 and 1.60. A physical film thickness of the optical anisotropic layer is 516 nm. FIG. 10 shows reflectance characteristics of the embodiment.

Refractive indexes (2.00 and 2.00) of the thin films adjacent to the optical anisotropic layer satisfy the conditional expression (2). The conditional expression (3) is also satisfied. As shown in FIG. 10, reflectances are set to minimal values at a wavelength of 550 nm for both polarized lights. In other words, reflectances are sufficiently reduced for both polarized lights at the wavelength of 550 nm.

Embodiment 5

Figure 11:
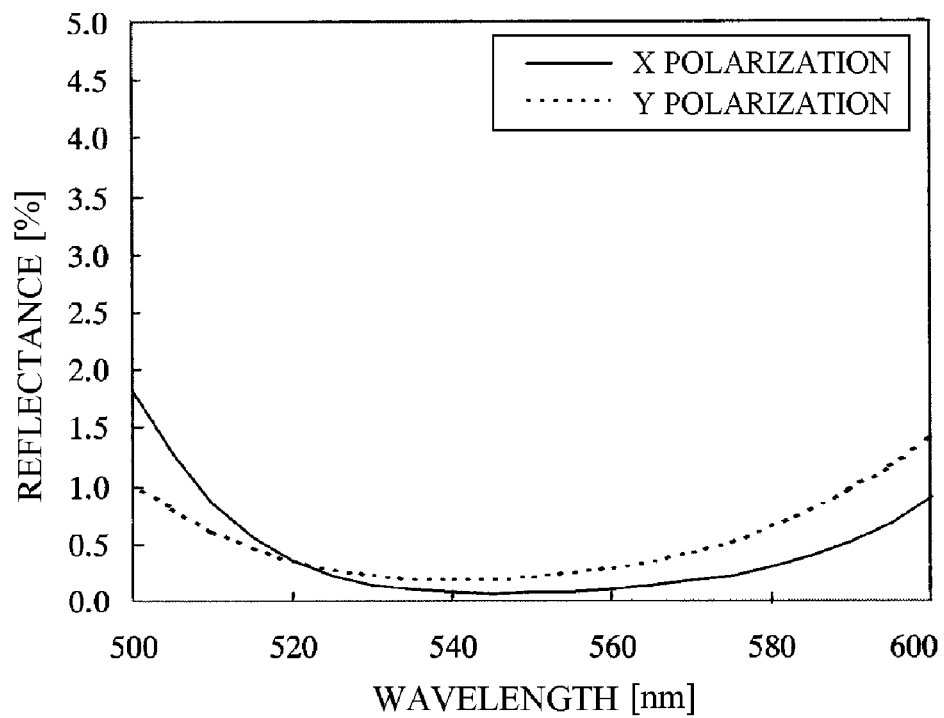
FIG. 11 is a view showing reflectance characteristics of an optical element of Embodiment 5.

In Embodiment 5, a substrate having a refractive index of 2.0 is prepared, a thin film (third layer) having a refractive index of 1.63 and a film thickness of 169 nm is stacked on a surface of the substrate, a thin film (second insertion layer) having a refractive index of 2.30 and a film thickness of 10 nm is stacked on a surface of the thin film (the third layer), and an optical anisotropic layer (first layer) is stacked on a surface of the thin film (the second insertion layer). A thin film (second layer) having a refractive index of 1.38 and a film thickness of 100 nm is stacked on a surface of the optical anisotropic layer. Refractive indexes $n_x(n_h)$ and $n_y(n_l)$ of the optical anisotropic layer are respectively 2.41. and 2.00. A physical film thickness of the optical anisotropic layer is 335 nm. FIG. 11 shows reflectance characteristics of the embodiment.

In the thin film having a film thickness of 10 nm, an optical film thickness $(n_{o2} \cdot d_{o2})$ calculated by the expression (4) is an extremely small value of 23 nm. The optical anisotropic layer can accordingly be considered to be optically adjacent to the thin film having a refractive index of 1.63. Thus, refractive indexes (1.63 and 1.38) of the thin films adjacent to the optical anisotropic layer satisfy the conditional expression (1). The conditional expression (3) is also satisfied. As shown in FIG. 11, reflectances are set to minimal values at a wavelength of 550 nm for both polarized lights. In other words, reflectances are sufficiently reduced for both polarized lights at the wavelength of 550 nm.

Table 1 collectively shows whether the numerical values and the conditions of Embodiments 1 to are satisfied (o). In Table 1, *1 indicates calculation carried out by assuming that it is the thin-film layer (third layer) having a refractive index of 1.63 and a film thickness of 169 nm that is optically adjacent to the optical anisotropic layer based on the expression (4).

refractive index of 1.38 and a film thickness of 100 nm is stacked on a surface of the optical anisotropic layer. In the optical anisotropic layer, a structure having a refractive index of 2.3 is formed into one-dimensional lattice shape smaller than a used wavelength. A filling rate is 0.80. Refractive indexes $n_x$ and $n_y$ of the optical anisotropic layer are respectively 2.11 and 1.69. A physical film thickness of the optical

TABLE 1

| # | Embodiment 1 | | Embodiment 2 | | Embodiment 3 | | Embodiment 4 | | Embodiment 5 | |
|---|---|---|---|---|---|---|---|---|---|---|
| | Refractive index | Physical film thickness | Refractive index | Physical film thickness | Refractive index | Physical film thickness | Refractive index | Physical film thickness | Refractive index | Physical film thickness |
| Incident medium | 1.00 | | 1.00 | | 1.00 | | 1.00 | | 1.00 | |
| Thin-film layer 1 | 1.38 | 100 | 1.38 | 100 | 1.38 | 100 | 1.38 | 100 | 1.38 | 100 |
| Thin-film layer 2 | — | — | — | — | — | — | 2.00 | 138 | — | — |
| Optical Anisotropic Layer | 1.92 / 1.80 | 1108 | 2.16 / 1.80 | 382 | 2.40 / 2.00 | 344 | 1.87 / 1.60 | 516 | 2.40 / 2.00 | 353 |
| Insertion layer | — | — | — | — | — | — | — | — | 2.30 | 10 |
| Thin-film layer 3 | 1.63 | 84 | 1.63 | 84 | 1.63 | 169 | 2.00 | 138 | 1.63 | 169 |
| Substrate | 1.53 | | 1.53 | | 2.00 | | 1.80 | | 2.00 | |
| Conditions (1) and (2) | ○ | | ○ | | ○ | | ○ | | ○ *1 | |
| Condition (3) | 7.75λ/2 ○ | | 3λ/2 ○ | | 3λ/2 ○ | | 3λ/2 ○ | | 3.1λ/2 ○ *1 | |
| Condition (4) | — | | — | | — | | — | | λ/25 ○ | |

Hereinafter, Comparative Examples 1 and 2 corresponding to Embodiments 1 to 5 will be described. These Comparative Examples do not satisfy (x) conditions (1) and (2) of Table 2.

Comparative Example 1

Figure 12:
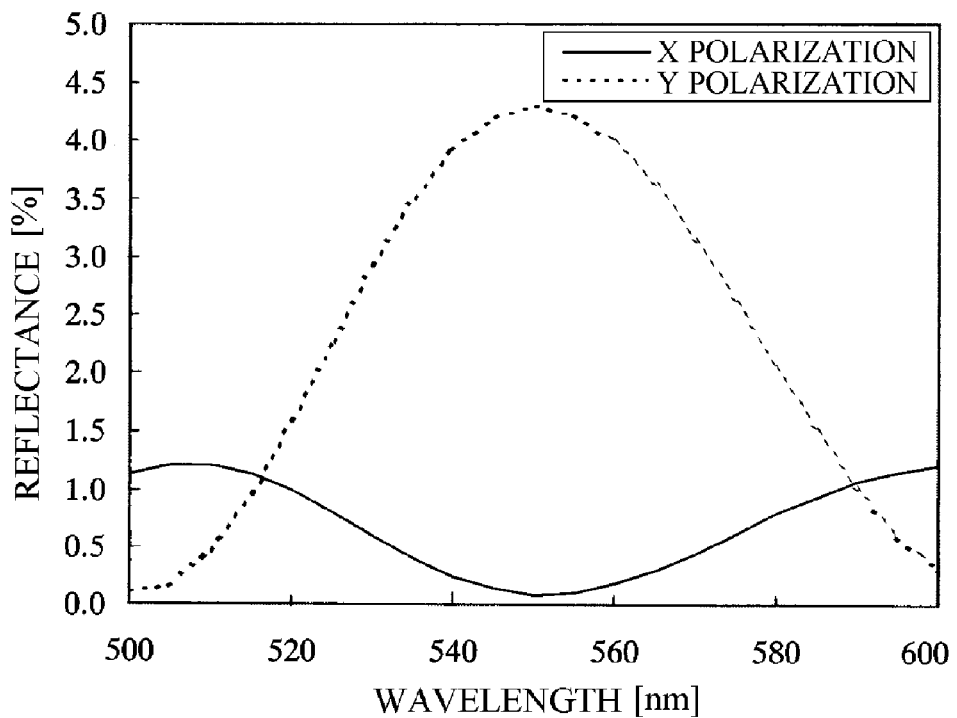
FIG. 12 is a view showing reflectance characteristics of an optical element of Comparative Example 1.

In Comparative Example 1, a substrate having a refractive index of 1.80 is prepared, and an optical anisotropic layer (first layer) is formed on a surface of the substrate. A thin film having a refractive index of 1.38 and a physical film thickness of 100 nm is stacked on a surface of the optical anisotropic layer. In the optical anisotropic layer, a structure having a refractive index of 1.8 is formed into one-dimensional lattice shape smaller than a used wavelength. A filling rate is 0.80. Refractive indexes $n_x$ and $n_y$ of the optical anisotropic layer are respectively 1.67 and 1.50. A physical film thickness of the optical anisotropic layer is 825 nm. FIG. 12 shows reflectance characteristics of Comparative Example 1.

In Comparative Example 1, to prevent reflection, the thin films having the low refractive indexes are stacked in the upper part. However, since a relationship of the refractive indexes or the film thicknesses are not appropriate, reflectances (especially reflectances at a wavelength of 550 nm) are greatly different between both polarized lights. Thus, Comparative Example 1 is not preferable.

Comparative Example 2

Figure 13:
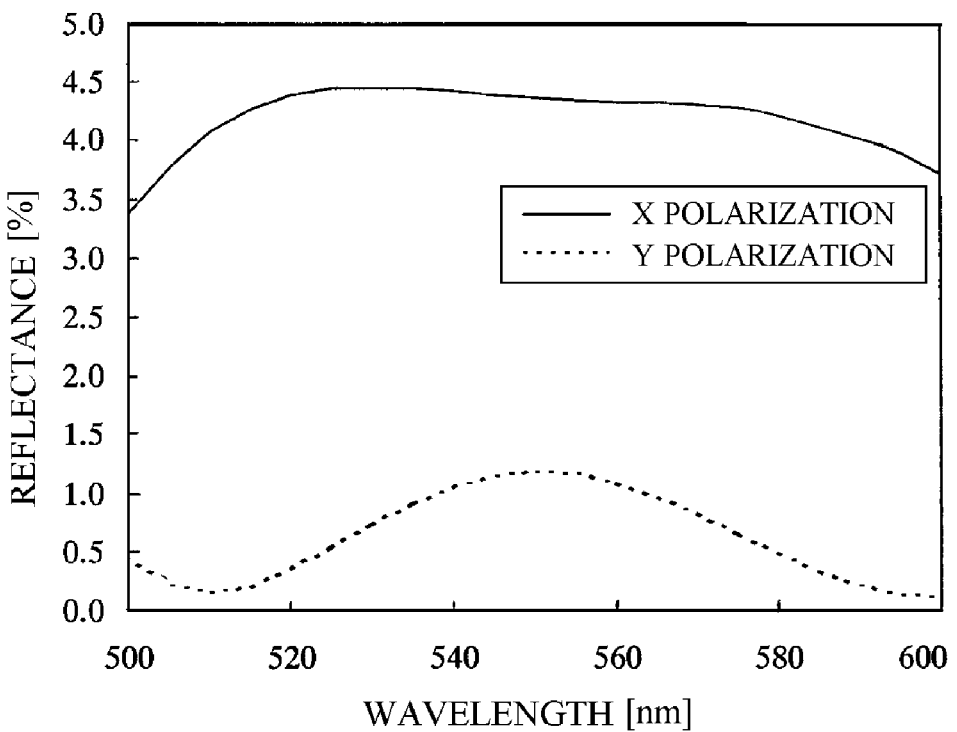
FIG. 13 is a view showing reflectance characteristics of the optical element of Comparative Example 1.

In Comparative Example 2, a substrate having a refractive index of 1.53 is prepared, a thin film having a refractive index of 2.30 and a film thickness of 120 nm is stacked on a surface of the substrate, and an optical anisotropic layer (first layer) is formed on a surface of the thin film. A thin film having a anisotropic layer is 325 nm. FIG. 13 shows reflectance characteristics of Comparative Example 2.

In Comparative Example 2, the thin-films are stacked on both interfaces of the optical anisotropic layer. However, no antireflection function is provided.

TABLE 2

| # | Comparative Example 1 | | Comparative Example 2 | |
|---|---|---|---|---|
| | Refractive index | Physical film thickness | Refractive index | Physical film thickness |
| Incident medium | 1.00 | — | 1.00 | — |
| Thin-film layer 1 | 1.38 | 100 | 1.38 | 100 |
| Thin-film layer 2 | — | — | — | — |
| Optical anisotropic layer | 1.67 / 1.50 | 825 | 2.11 / 1.69 | 325 |
| Insertion Layer | — | — | — | — |
| Thin-film layer 3 | — | — | 2.30 | 120 |
| Substrate | 1.80 | — | 1.53 | — |
| Conditions(1) and (2) | X | | X | |
| Condition(3) | — | | — | |
| Condition(4) | — | | — | |

Embodiment 6

Hereinafter, a liquid crystal projector and an optical pickup apparatus will be described as examples of optical apparatus which use the optical elements of Embodiments 1 to 5. However, the optical elements of Embodiments can be used for other optical apparatus.

Figure 14:
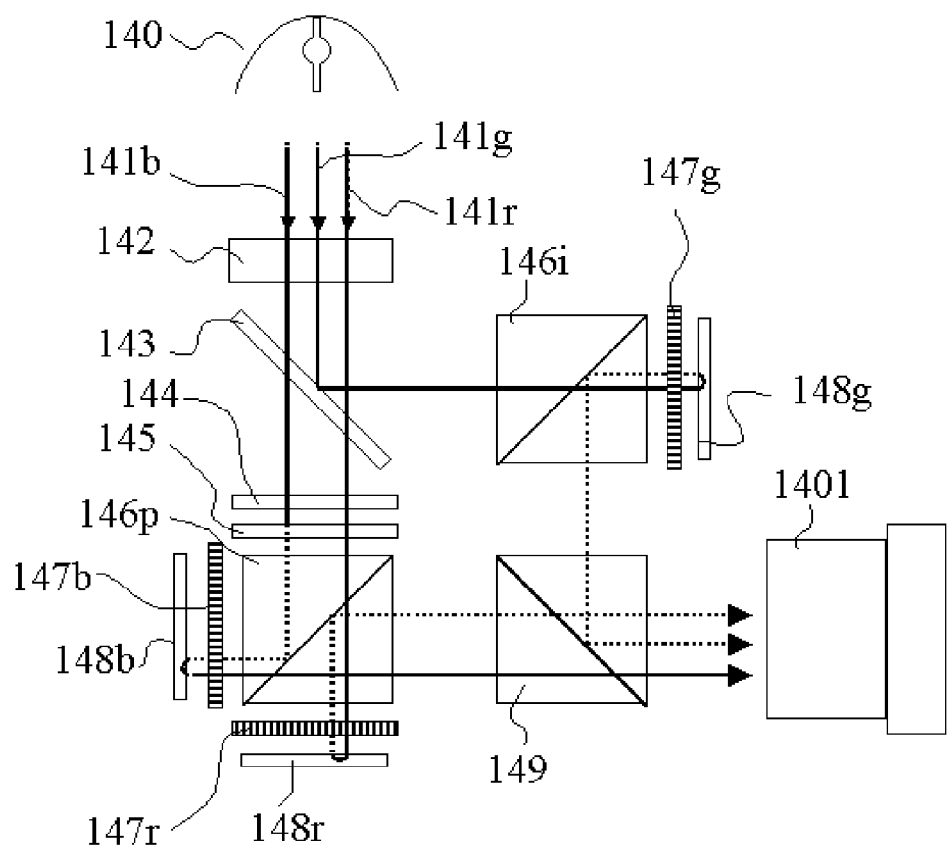
FIG. 14 is a view showing a configuration of a liquid crystal projector which uses the optical elements of any of Embodiments 1 to 5.

FIG. 14 shows a configuration of a liquid crystal projector. Reference numeral 140 denotes a light source (lamp), reference numeral 141r denotes an optical path of a red light, reference numeral 141g denotes an optical path of a green light, and a reference numeral 141b denotes an optical path of a blue light. Reference numeral 142 denotes a polarization conversion element, and reference numeral 143 denotes a dichroic mirror. Reference numeral 144 denotes a polarization plate, and reference numeral 145 denotes a wavelength-selective phase plate.

Reference numeral 146i denotes a green polarization beam splitter, and reference numeral 146p denotes a red polarization beam splitter. Reference numerals 147r, 147g, and 147b respectively denote red, green and blue 1/4λ plate. Reference numerals 148r, 148g, and 148b respectively denote red, green, and blue reflective liquid crystal panels (image forming elements). Reference numeral 149 denotes a color synthesis prism, and reference numeral 1401 denotes a projection lens.

A beam from the light source 140 is converted into a beam having a specific polarization direction by the polarization conversion element 142. The polarized beam is converted for each color into a P-polarized or S-polarized light by the wavelength-selective phase plate 145 and 1/4λ plates 147r, 147g and 147b, and reflected or transmitted by the polarization beam splitters 146i and 146p. Thus, each color light projected through a corresponding optical path to a projected surface such as a screen (not shown) by the projection lens 1401 to form a color image on the projected surface.

The optical elements of Embodiments 1 to 5 can be used as the wavelength-selective phase plate 145 and the 1/4λ plates (phase plates) 147r, 147g, and 147b.

The optical elements of Embodiments 1 to 5 can be miniaturized since their thicknesses can be reduced, and high transmittances can be realized as the phase plates for entering P-polarized and S-polarized lights. As a result, a high-performance projector can be provided. The use of the inorganic material for the first layer of the optical element enables realization of a projector of high heat resistance and high weather resistance.

Figure 15:
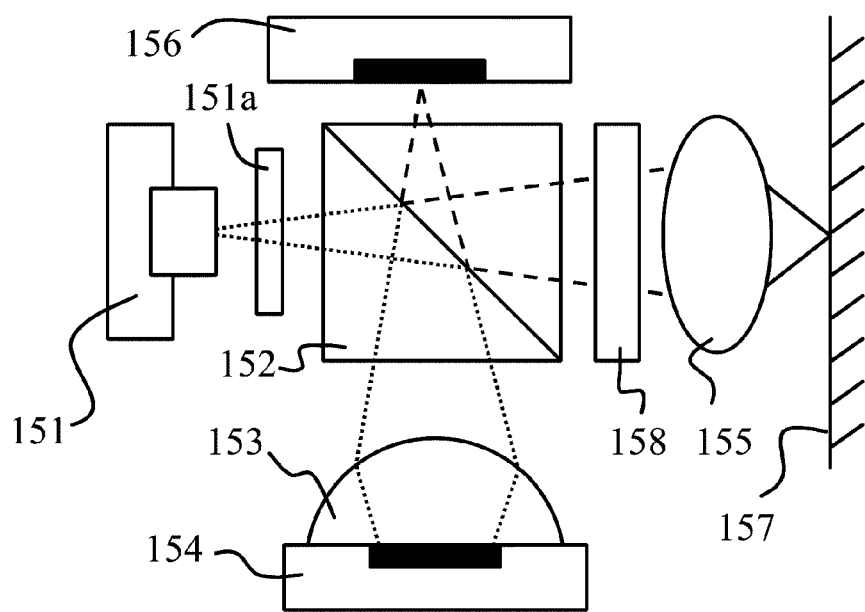
FIG. 15 is a view showing a configuration of an optical pickup apparatus which uses the optical element of any of Embodiments 1 to 5.

FIG. 15 shows an optical system around a light source in an optical disk optical pickup apparatus. Reference numeral 151 denotes a light source (laser), and reference numeral 151a denotes a polarization plate. Reference numeral 152 denotes a polarization beam splitter, and reference numerals 153 and 155 denote condenser lenses, and reference numerals 154 and 156 denote photodetectors. Reference numeral 157 denotes an optical disk, and reference numeral 158 denotes a phase plate.

A beam from the light source 151 enters the polarization beams splitter 152 as a beam (P-polarized light) having a specific polarization direction by the polarization plate 151a. A part of the polarized beam is reflected by the polarization beam splitter 152 to be monitored by the photodetector 154 via the condenser lens 153.

The polarized beam transmitted through the polarization beam splitter 152 forms an image on the optical disk 157 by the condenser lens 155 via the phase plate 158. The reflected light optically modulated at the optical disk 157 has its polarization direction rotated by 90° by the phase plate 158 to become an S-polarized light, and is reflected by the polarization beam splitter 152. Then, the reflected light is detected by the photodetector 156 for detecting a reproduced signal light.

The optical elements of Embodiments 1 to 5 can be used for the phase plate 158. The optical elements of Embodiments 1 to 5 can be miniaturized because their thicknesses can be reduced, and high transmittances can be realized for entering P-polarized and S-polarized lights. As a result, a high-performance optical pickup apparatus can be provided. The use of the inorganic layer for the first layer of the optical element enables realization of an optical pickup apparatus of high heat resistance and high weather resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-139360, filed on May 28, 2008, which is hereby incorporated by reference herein in its entirety.

What is claimed is:

1. An optical element comprising:
a first layer made of a medium having optical anisotropy, wherein a difference between refractive indexes $n_h$ and $n_l$ ($n_h > n_l$) at a central wavelength λ for first and second polarized lights which enter the optical element and whose polarization directions are different from each other is at least 0.1, and
wherein conditions below are satisfied, where $n_{t1}$ and $n_{t2}$ denote refractive indexes of second and third layers optically adjacent to the first layer in both sides of the first layer and made of isotropic media at the central wavelength:

$$(n_{t1}-n_l)\cdot(n_l-n_{t2}) \leq 0$$

$$n_{t1} < n_l.$$

2. An optical element according to claim 1, wherein a condition below is satisfied, where n denotes a refractive index of the refractive indexes $n_h$ and $n_l$ larger in difference from the refractive indexes $n_{t1}$ and $n_{t2}$ of the second and third layers, and d denotes a thickness of the first layer:

$$0.7m \cdot \frac{\lambda}{2} \leq n \cdot d \leq 1.3m \cdot \frac{\lambda}{2} \quad (m \text{ is a natural number})$$

3. An optical element according to claim 1, further comprising at least one of a first insertion layer disposed between the first and second layers and a second insertion layer disposed between the first and third layers,
wherein conditions below are satisfied, where at the central wavelength, $n_{o1}$ denotes a refractive index and $d_{o1}$ denotes a layer thickness of the first insertion layer, and $n_{o2}$ denotes a refractive index and $d_{o2}$ denotes a layer thickness of the second insertion layer:

$$0 \leq n_{o1} \cdot d_{o1} \leq \frac{\lambda}{6}$$

$$0 \leq n_{o2} \cdot d_{o2} \leq \frac{\lambda}{6}$$

4. An optical element according to claim 1, wherein the first layer is a layer having structural anisotropy obtained by forming a plurality of structures smaller than the central wavelength.

5. An optical element according to claim 1, wherein the first layer is made of an inorganic material.

6. The optical element according to claim 1, wherein the optical element is a phase plate.

7. An optical apparatus comprising:
an optical element;
wherein the optical element includes a first layer made of a medium having optical anisotropy,
wherein a difference between refractive indexes $n_h$ and $n_l$ ($n_h > n_l$) at a central wavelength $\lambda$ for first and second polarized lights which enter the optical element and whose polarization directions are different from each other is at least 0.1, and
wherein conditions below are satisfied, where $n_{t1}$ and $n_{t2}$ denote refractive indexes of second and third layers optically adjacent to the first layer in both sides of the first layer and made of isotropic media at the central wavelength:

$(n_{t1} - n_l) \cdot (n_l - n_{t2}) \leq 0$ $n_{t1} < n_l$.

* * * * *